US007239787B2

United States Patent
Kumakhov

(10) Patent No.: US 7,239,787 B2
(45) Date of Patent: Jul. 3, 2007

(54) DEVICE FOR SHAPING OF AN OPTICAL RADIATION FLUX

(76) Inventor: Muradin Abubekirovich Kumakhov, Moscow 123298, ul. Narodnogo Opolcheniya, d. 38, kv. 55, Moscow (RU)

( * ) Notice: Subject to any disclaimer, the term of this patent is extended or adjusted under 35 U.S.C. 154(b) by 3 days.

(21) Appl. No.: 10/276,155

(22) PCT Filed: Jun. 14, 2002

(86) PCT No.: PCT/RU02/00292

§ 371 (c)(1),
(2), (4) Date: Nov. 13, 2002

(87) PCT Pub. No.: WO03/107052

PCT Pub. Date: Dec. 24, 2003

(65) Prior Publication Data

US 2004/0026609 A1    Feb. 12, 2004

(51) Int. Cl.
*G02B 6/00* (2006.01)
*G02B 6/04* (2006.01)
(52) U.S. Cl. ........................ 385/133; 385/121
(58) Field of Classification Search ........ 385/115–121, 385/133, 146, 147
See application file for complete search history.

(56) References Cited

U.S. PATENT DOCUMENTS 5,192,869 A * 3/1993 Kumakhov .............. 250/505.1
5,744,813 A * 4/1998 Kumakhov .............. 250/505.1
6,271,534 B1 8/2001 Kumakhov .............. 250/505.1
6,418,254 B1 * 7/2002 Shikata et al. ............. 385/116

FOREIGN PATENT DOCUMENTS

RU    2096353    11/1997
RU    2164361    3/2001

OTHER PUBLICATIONS

Physical Encyclopedia, Moscow, "Sovetskaya Entsiklopediya" publishing house, 1984, pp. 200, 347-348.

* cited by examiner

*Primary Examiner*—Kevin Wood
(74) *Attorney, Agent, or Firm*—McDermott Will & Emery LLP

(57) ABSTRACT

A device for conversion of an optical radiation flux, the device having a plurality of channels for receiving and transmitting optical flux and the channels having input 6 and output 8 end faces. Radiation, such as light, may be transported with or without reflections from the interior walls of the channels, depending upon curvature or lack thereof. Radiation diverging from a point source can be focused by the device to form large or small images following the output of the device along a longitudinal axis thereof. The input and output faces of the device can be used in reverse fashion. Radiation passing through the device will continue along a directed path in accordance with axial extensions, or continuations, of the individual channel axis.

17 Claims, 7 Drawing Sheets

DEVICE FOR SHAPING OF AN OPTICAL RADIATION FLUX

FIELD OF THE INVENTION

The invention relates to optics and is used for shaping of an optical radiation flux.

BACKGROUND OF THE INVENTION

Devices are known for shaping or conversion of an optical radiation flux, in particular, for focusing of diverging radiation of a source, changing or transformation of such radiation into quasi-parallel one, focusing of quasi-parallel radiation or its scattering (changing or conversion into diverging one), etc. These devices are usually made in the form of optical lenses or convex or concave mirrors (Physical encyclopedia, Moscow, "Sovetskaya Entsiklopediya" publishing house, 1984, p. 347, 200) [1].

Such devices, when used in the optical systems for generation of an optical image or for changing or conversion of radiation flux emanating from a radiation source, exhibit different aberrations ([1], p. 7), in particular, due to the fact of lens or mirror as a whole participating in light transfer from each point of an object to the image element corresponding to that point.

The closest known prior art is in the form of lenses. Optical lenses are similar to the present invention in that they are normally used for shaping or conversion of a flux of paraxial beams impinging upon the lens at small angles to its optical axis. Input flux is shaped as a result of passing through the lens, impinging it on one side and coming out from the opposite side.

SUMMARY OF THE INVENTION

The present invention provides differential transfer of radiation energy and its corresponding optical information from different elements of the input flux created with a source of light or illuminated object. Because of independent transfer of energy (information) from different elements of the flux (points of an illuminated or luminous object), prerequisites are created for elimination of aberrations inherent to traditional lens systems, and qualitative characteristics of the device depend potentially only on technological possibilities of its manufacture. Another kind of technical result achieved by the device is an "automatic" provision of spatial discretization of the output flux. This facilitates interfacing of the device with digital matrix converters.

Two embodiments are proposed of the device.

According to a first embodiment, the device is characterized in that it has inlet and outlet end faces connected with a multitude of channels. Channels are made with a possibility of passage or transportation through them of optical radiation with or without reflection from the walls. Channels continuations, i.e., axial extensions, beyond the input and output end faces together have a form of input optical radiation flux perceived by the device, and a desired or required output flux, correspondingly. In one of the embodiments proposed the input end face or both end faces of the device, except for input and output openings of the channels, has a coating made of a material non-transparent for optical radiation in the range of wavelengths used.

According to the second embodiment, the device has input and output end faces connected with a multitude of channels made with a possibility of passage or transportation through them of optical radiation with or without reflection from their walls. Channels continuations, i.e., axial extensions, beyond input and output end faces together have a form of input optical radiation flux perceived by the device, and a desired or required output flux, correspondingly. Walls of the channels and spaces between them are made of a material non-transparent for optical radiation of the range of wavelengths used.

Thus, both embodiments are similar in that they have multitude of channels for transportation of the radiation from input to output of the device, the form of the input flux (beam), with which the device is intended to work, and the form of the output flux (beam), into which the input flux (beam) of optical radiation should be transformed, are determined by orientation of the channels' ends from the input and output sides of the device (from the side of its input and output end faces). Parts of the channels situated between their end portions serve to conjugate the end portions.

The embodiments are differing in the way of elimination of radiation transportation from the input to output of the device through the medium filling out space between the channels. In the first embodiment, to this end a coating is applied on one or both end faces, which is non-transparent for radiation in the range used (the input and output openings of the channels remaining exposed). In the second embodiment, walls of the channels and spaces between them are made of a material non-transparent for optical radiation in the range used.

The particular cases of the device embodiments described below may be executed in both variants.

The channels may be evacuated or filled up with air or other gaseous medium. In this case, radiation losses on transition through the channels will be small.

The channels may be filled up with a medium transparent for the radiation used, which has density above that of the walls. In this case, conditions may be met for a total internal reflection during radiation propagation through the channels.

The channels may be made with longitudinal axes curved along generating lines of coaxial barrel-shaped surfaces. At that, when extensions or continuations of longitudinal axes of the channels from the input and output end faces of the device are intersecting at points located on an extension or continuation of the longitudinal axis of the device, the latter is able to perform focusing of divergent radiation from a point source. If, however, continuations or extensions of the longitudinal axes of the channels from the side of one of the end faces of the device intersect at a point located on the extension or continuation of the longitudinal axis of the device, while the continuations of longitudinal axes of the channels from the side of the other end face of the device are parallel to the longitudinal axis of the device, the device effects transformation of divergent radiation from the source into a quasi-parallel one or, vice versa, focusing of a quasi-parallel radiation.

With the above construction of the channels, they may have cross sections constant with length or cross section changing in size in the same manner as dimensions of the device as a whole in a transverse direction.

Part of the device adjacent to its longitudinal axis may be made non-transparent for the radiation used. Because of this, when the device is used for radiation focusing, dimensions of the focal region decrease longitudinally.

The device may be made also in such a way that continuations or extensions of the longitudinal axes of the channels from the side of one of the end faces intersect in a point located on the continuation of the longitudinal axis of the device or are parallel to the axis, while continuations or extensions of the longitudinal axes of the channels from the side of another end face of the device diverge from the longitudinal axis of the device. In this case, the device generates scattered radiation from radiation having already certain angle of divergence, or from quasi-parallel radiation.

The device may be used also for turning or bending of the radiation, in which case it may have a longitudinal axis with one or several bends and channels equidistant with it.

DETAILED DESCRIPTION OF THE INVENTION

Figure 1:
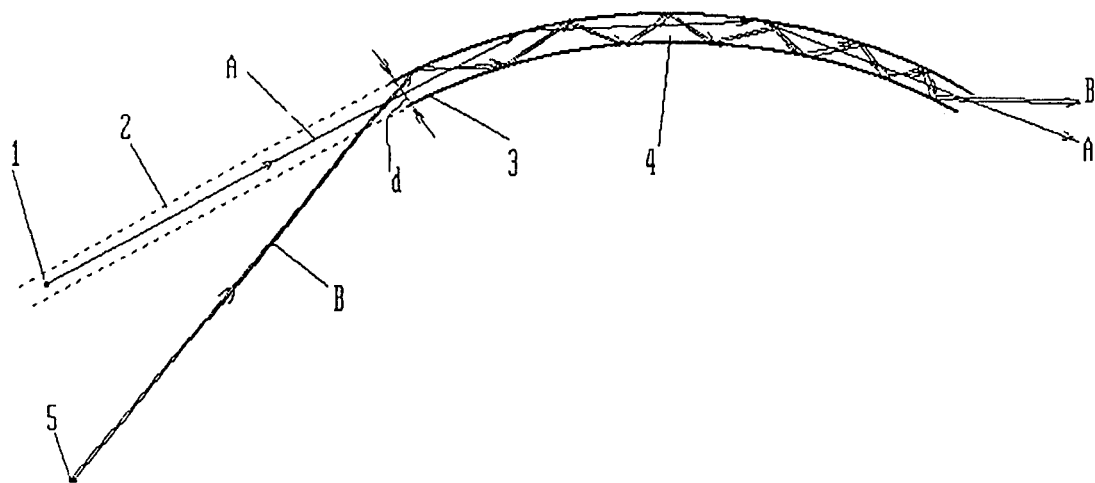
FIG. 1—illustrates transmission of the radiation through a single channel at different directions of rays entering into the channel, FIG. 2—shows basic components of the device, including input and output faces and a plurality of channels each having an inlet end and an outlet end, FIG. 3—shows an aggregate of parallel input ends of channels and corresponding quasi-parallel radiation flux, FIG. 4—shows an aggregate of convergent ends of channels with continuations intercepting in point of location of a point source, and shows diverging input flux of radiation, FIG. 5—shows a device for focusing of an optical radiation from a point source wherein the cross section of the channels is constant along their length, FIG. 6—shows a device for transforming diverging optical radiation from a point source into quasi-parallel one or for focusing of quasi-parallel optical radiation having a constant cross section along the length of the channels, FIGS. 7 and 8—are similar to FIG. 5 and FIG. 6, respectively, with channels having transverse dimensions changing with length in a manner similar to cross sectional dimensions of the device as a whole, FIG. 9—illustrates one embodiment with flat end faces, FIG. 10—illustrates one embodiment having a central portion made non-transparent to the radiation used, FIG. 11—shows use of the device for generation of an object's image, FIG. 12—shows transformation of quasi-parallel flux of optical radiation into scattered radiation, FIG. 13—shows an embodiment having equidistant curved channels.

Operation of the device is based on radiation transmission from an input to an output through a multitude of separate channels. When source 1 (FIG. 1) of radiation is situated within the limits of an axial extension or continuation of an input end 3 of the channel 4, this radiation (see, for example, beam A in FIG. 1) enters the channel 4 at a small angle to its walls and passes through to the channel output with a minimal number of reflections from the interior walls. Radiation originating from differently situated points (for example, beam B in FIG. 1, emanating from point 5) enters channel 4 at a larger angle and suffers greater number of reflections, resulting in a greater extent of attenuation. Difference in the transmission conditions of beams A and B is the greater, the smaller dimension d of the channel is in transverse direction.

Figure 3:
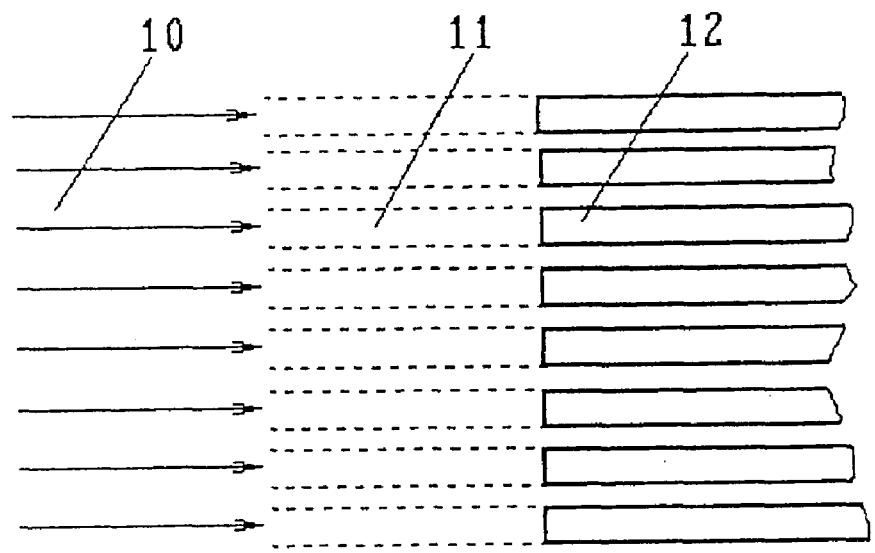
Figure 4:
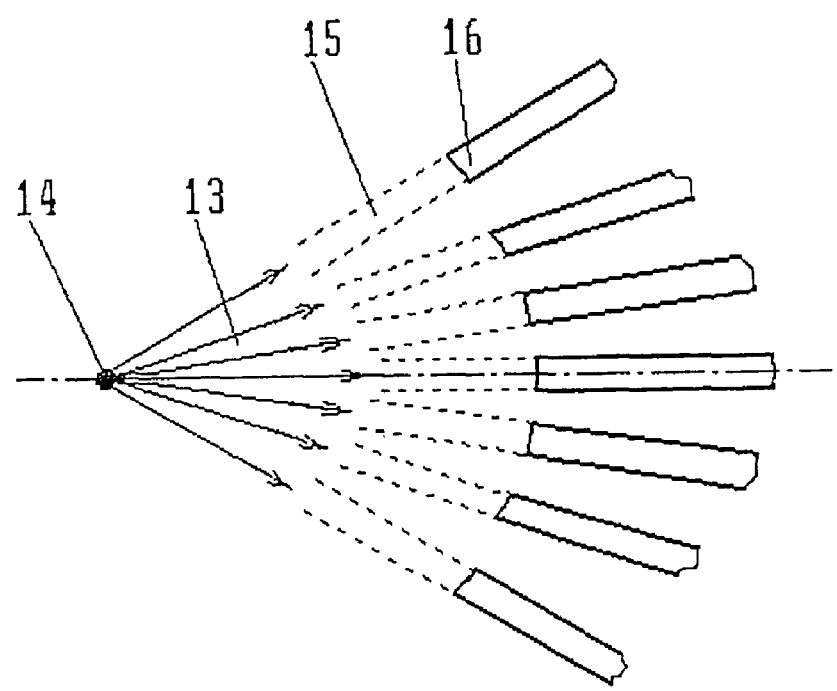

Input of the device consists of its input end face 6 (FIG. 2) comprising aggregate of one of the inlet ends 7 of the channels, while output consists of the output end face 8 comprising aggregate of the other or outlet ends 9 of the channels. In the course of manufacturing the device the ends of the channels 4 are oriented in such a way as to ensure conformance with a shape of radiation beam requiring to be transformed. For that, aggregate of axial extensions or continuations of the channels towards the radiation sources should have the same shape as the beam transformed. Thus, to transform a parallel or quasi-parallel beam 10 (FIG. 3) the axial extensions or continuations 11 of the input ends 12 of the channels of the device should be parallel to one another, while aggregate of their cross sections for the full capturing of the source radiation should be the same as the cross section of the beam being transformed or to include completely the cross section of the beam being transformed. To transform beam 13 (FIG. 4) of diverging radiation from a point or quasi-point source 14 the axial extensions or continuations 15 of the input ends 16 of the channels of the device should intersect in the spot of the source location. Captured and transformed will be just that part of the source radiation which is emanated within limits of the spatial angle formed by aggregate of continuations of the input ends of the channels. Likewise, orientation of the continuations or axial extensions of the output ends of the channels is chosen depending on the required shape of the output beam, while cross-sectional dimensions of the beam are determined by aggregate cross section of the output ends 8 of the channels.

Shape of the parts of the channels located between their end portions is chosen under the condition of smooth alignment of the end portions.

Through the central channels, i.e., adjacent to the longitudinal axis of the device, which have small curvature or are rectilinear, radiation may be transmitted without reflection from their walls.

Figure 5:
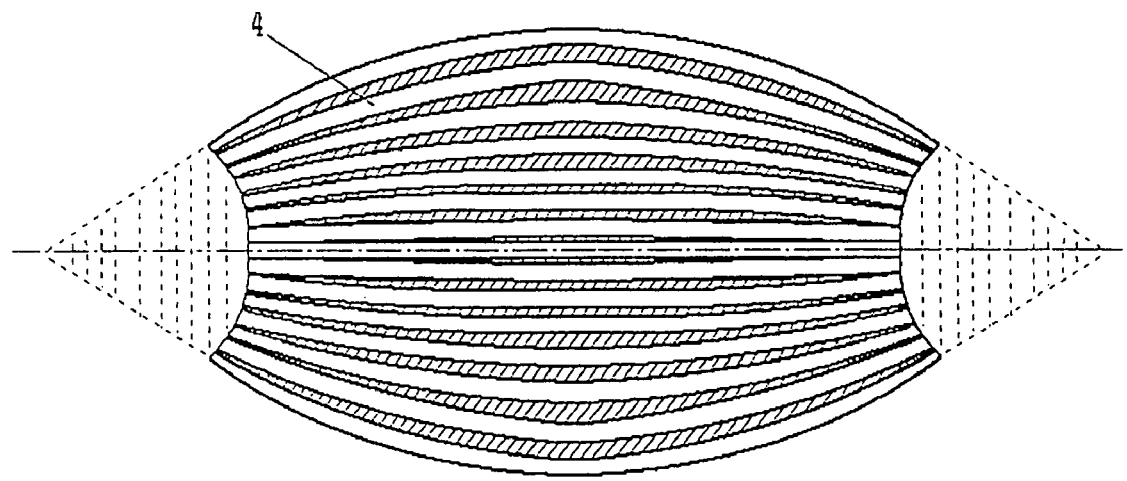
Figure 6:
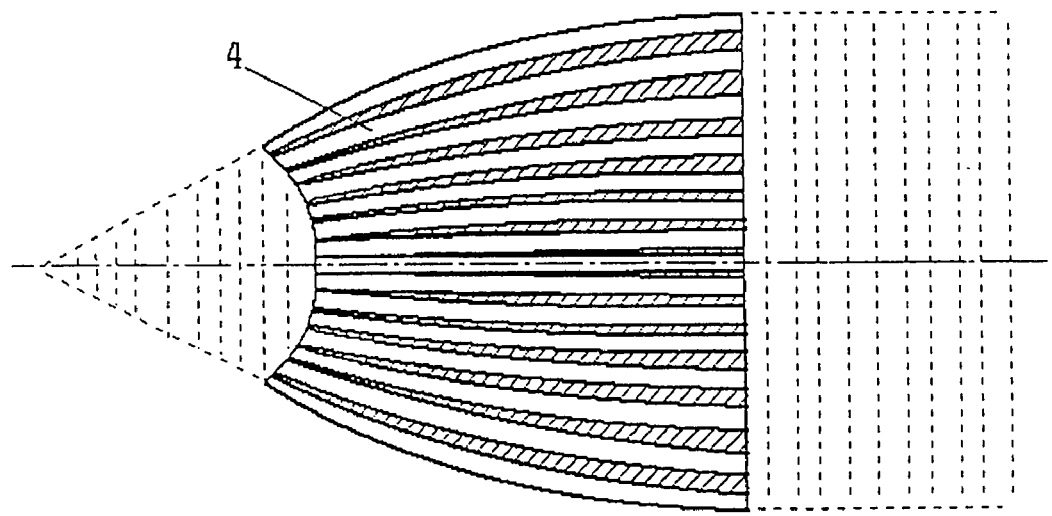

In both embodiments described above, the invention may comprise channels 4 for transportation of the optical radiation, which have cross section constant through their length (FIG. 5, FIG. 6). In this case, the device is assembled of separate like channels, for example, glass capillaries, using some kind of separating elements to impart desired shape to the channels and the device as a whole, similar to method of X-ray lenses assembling according to my U.S. Pat. No. 5,192,869 (publ. 09.03.93) [2]. According to the first embodiment of the device, solid separating element with openings for the ends of the channels may function as a part of the end face non-transparent for radiation of the range used. The device according to the second embodiment may also be manufactured by a technology disclosed in my earlier mentioned patent, which envisages filling up of space between channels with a compound instead of using separating elements. According to the second embodiment of the invention proposed above, the compound should be non-transparent for the optical radiation used.

Channels 4 may have their cross section changing in size (FIG. 7, FIG. 8) in the same manner as cross-sectional dimensions of the device as a whole. In this case, technology of glass slugs drawing is applicable for manufacturing of the device, as disclosed in my Russian Federation patent No. 2096353 (publ. 20.11.97 [3]). This technology, with which the process may be automated to a great extent, is a more progressive one in comparison with the assembly method. However, the most promising one is a technique used for manufacture of so called integral X-ray lenses (see my Russian Federation patent No. 2164361, publ. 20.03.2001 [4]; and my U.S. Pat. No. 6,271,534, publ. 07.08.2001[5]), allowing construction of devices having a large number of the channels in micron and submicron diameter range. On completion of the manufacturing process stages according to [4] or [5], a monolithic device is obtained with end faces formed by melting together the ends of the channels. To finish manufacturing of the device according to the first embodiment proposed, a material non-transparent for the radiation used is deposited (for example, sprayed) on the surface of one or both end faces formed by spaces between the channels. In particular, this may be sprayed, radiation reflecting material. In this case, there is no need to take special measures to avoid its getting into the channels and depositing on their walls. To produce the device according to the second embodiment, tubular slugs of the future channels are used made of material non-transparent for the radiation used, for example, stained glass.

In all the cases of the embodiments described, it is important for its proper operation to exclude transportation of the radiation from input to output of the device through the medium used for filling up spaces between the channels. This is provided for with the above measures ensuring involvement in generation of the output flux only of the radiation transported through the channels. From the input side, the channels ensure the selectivity required, while their output ends direct the radiation as required. If no such measures are taken, the radiation is able to penetrate channel walls from one channel to another, propagate through spaces between the channels, and reach the output of the device not through exit openings of the channels or through them, but in arbitrary directions. Experiments demonstrate that as a result of this, desired effects are not achieved, in particular, those of focusing or shaping of quasi-parallel beam.

In FIGS. 5 to 9 vertical hatching denotes spatial zones formed by aggregate continuations or axial extensions of the ends of the channels 4 beyond the input and output end faces. Those zones have form, correspondingly, of input flux of optical radiation received by the device, and of the required or desired output flux. For all the devices invertibility takes place. Thus, for the focusing devices shown in FIG. 5 and FIG. 7, either one of the end faces may be the input face, while the other will be the output face. The devices shown in FIG. 6 and FIG. 8, on feeding of diverging flux of radiation from the source, for example, point source 14, from the side of left end face generate in the output a flux of quasi-parallel radiation, while on feeding the same radiation from the side of the right end face generate focused radiation flux. The devices shown in FIG. 5 and FIG. 7 have a barrel-like shape, and the devices shown in FIG. 6 and FIG. 8 resemble a half-roll. In both cases, center lines of the channels, except those in the core (adjacent to the longitudinal axis of the device) are curved along generating lines of barrel-shaped surfaces.

Figure 2:
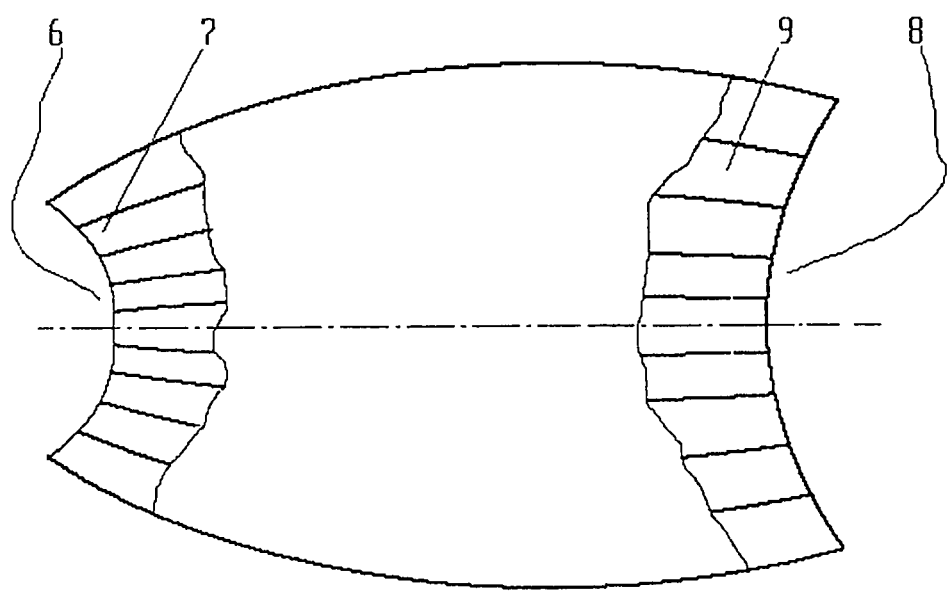
Figure 7:
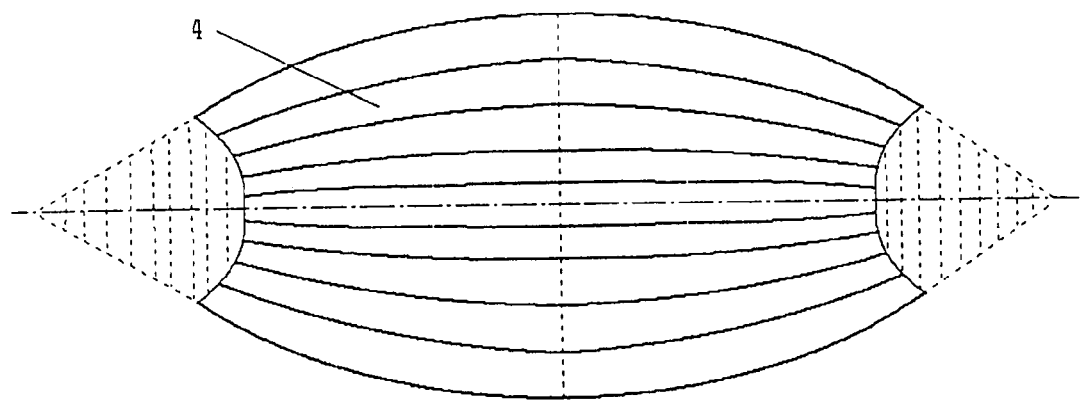
Figure 8:
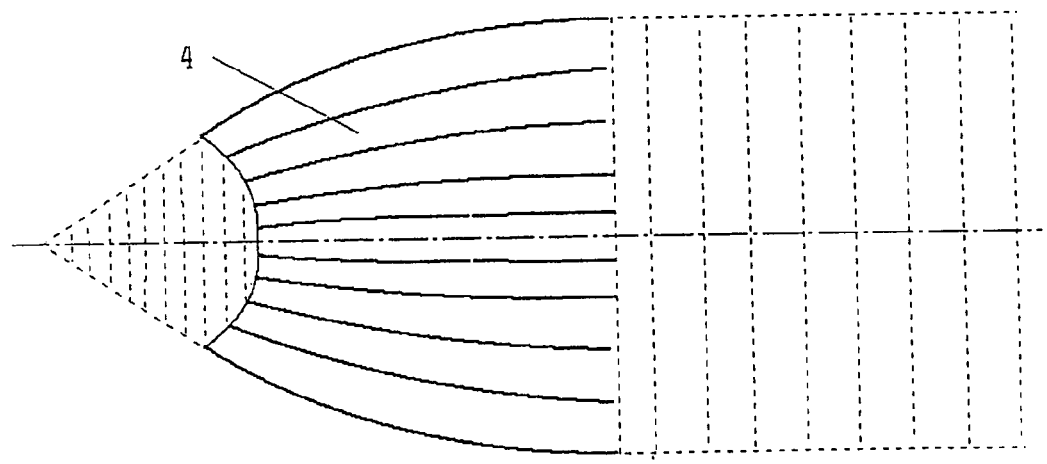
Figure 9:
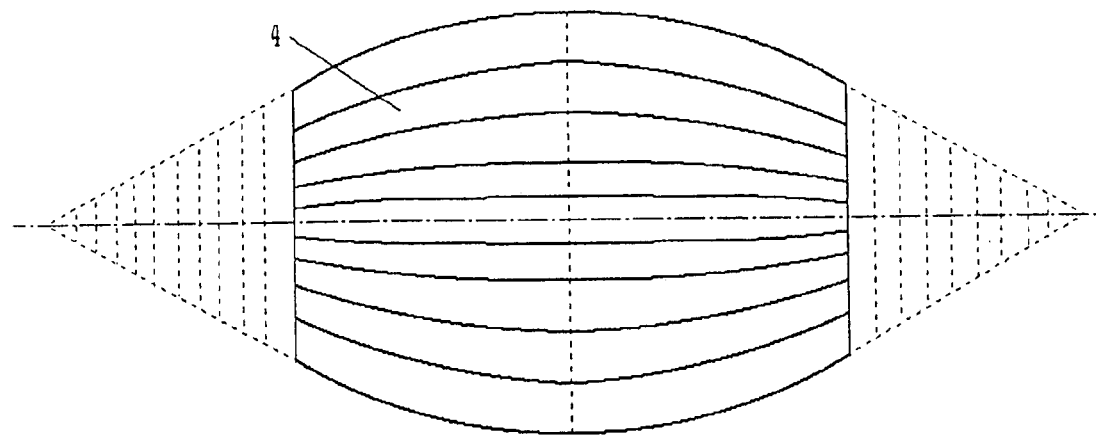

The end faces of the device may be rounded, like both end faces of the devices in FIG. 2, FIG. 5, and FIG. 7, and left end faces of the devices in FIG. 6 and FIG. 8, or flat, as right end faces of the devices in FIG. 6 and FIG. 8, or both end faces of the device in FIG. 9. It is expedient to make the end faces flat when radiation entering this end face or emergent from it is quasi-parallel, as well as in cases when the channels are evacuated or filled up with gaseous medium other than air. In this case the end faces are coated with a film transparent for the radiation used to ensure airtightness.

The channels may be filled up with a medium having density higher than that of their walls. As such channels, for example, optical fibers may be used with quartz core. In this case, losses of radiation energy during its transportation through the channels may be diminished due to utilization of the full internal reflection phenomenon.

Figure 10:
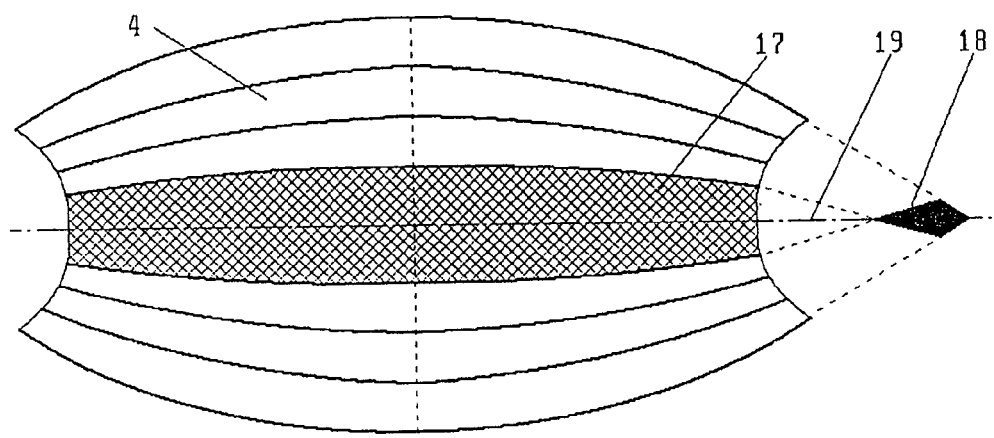

When using the device proposed for focusing of optical radiation, the focal region may be strongly diffused longitudinally due to the presence of rectilinear or slightly bent central (adjacent to the longitudinal axis of the device) channels. Focusing quality may be increased by the way of making the part of the device adjacent to its longitudinal axis non-transparent to the radiation used. This may be achieved both by making this part 17, as shown in FIG. 10, solid of non-transparent material, i.e. containing no channels, and by blocking inlet or outlet openings of the central channels after manufacturing of the device containing such channels. Decrease in the longitudinal size of focal region 18 is achieved due to the fact of it being formed only by radiation of peripheral channels emergent at an angle to the longitudinal axis 19 of the device.

Figure 11:
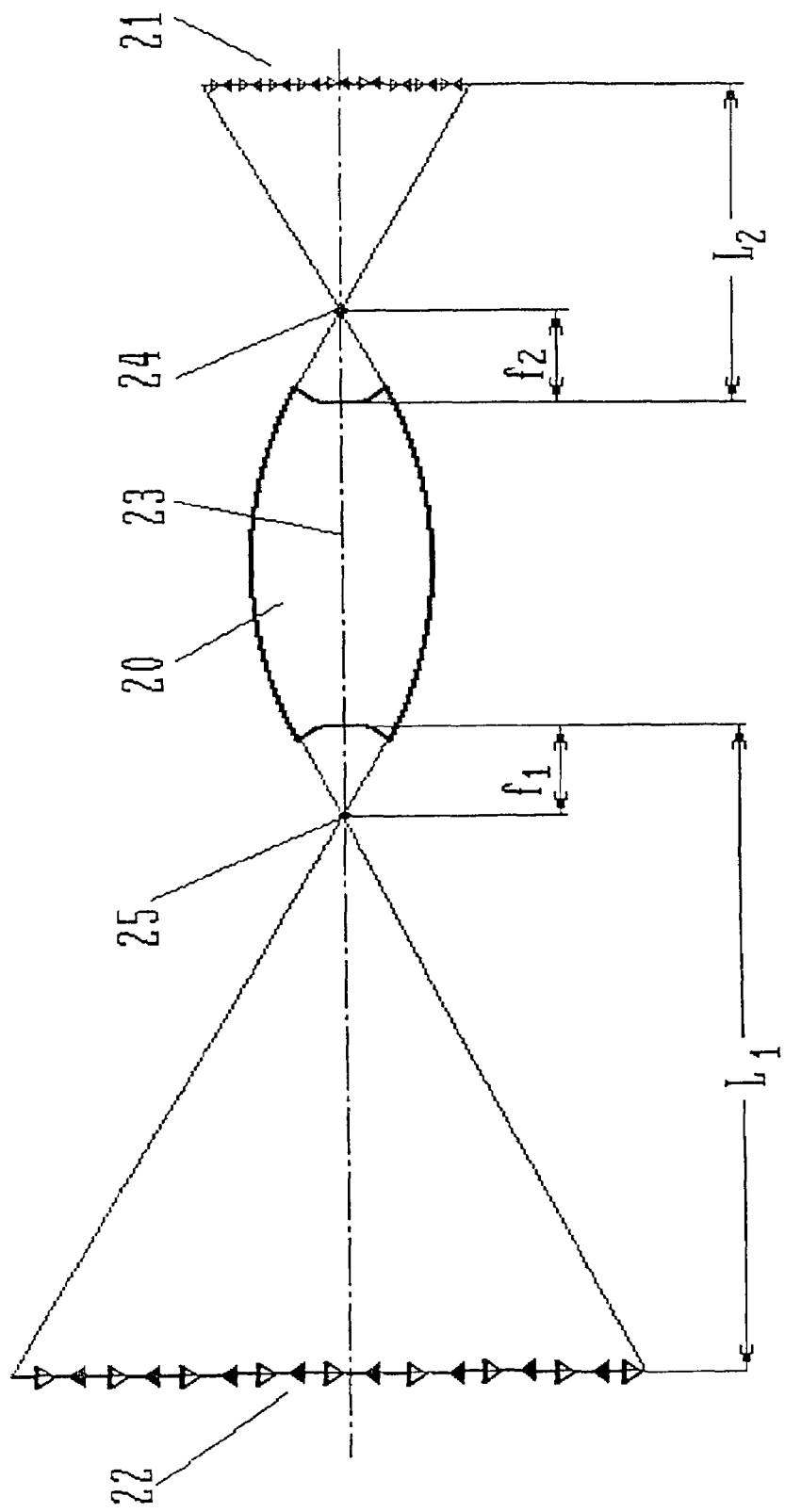

By analogy with traditional optical lenses and taking into account the functions performed, the device proposed in the embodiments considered may be named a lens. When using such lens as a means for image generation of a flat object, each channel serves for transmittance of information on one element of the object only, situated on an axial continuation of the input end of this channel. As it was stated above, influence of elements located aside of this continuation is the weaker, the smaller the diameter of a separate channel. On using the device 20 (FIG. 11) of the type shown in FIGS. 5, 7, and 9, image 21 of the object 22 may be obtained in any plane perpendicular to the longitudinal axis 23 of the device 20, to the right of its output end face (both to the right and to the left of output focus 24, which is defined as the intersection point of axial continuations of longitudinal axes of the channels from the outlet side). Object 22, whose image is generated, may be located both to the right and to the left of input focus 25, which is defined as intersection point of continuations of longitudinal axes of the channels from the input side. In the case shown in FIG. 11, object 22 is located to the left of the input focus 25, and the image generated—to the right of the output focus 24, that is, planes of the object and of the image are removed from corresponding end faces to the distances $L_1$ and $L_2$ exceeding focal distances $f_1$ and $f_2$ (the latter being defined as distances from the inlet (outlet) of the central channel to corresponding focus).

The image obtained in this case is "non-inverted". A dot element of the object corresponds to image element having minimal dimension of the order $d(1+2L_2/L_1)$, where d denotes cross-sectional dimension of the channel (for circular cross section—its diameter). Since usually in image acquisition of macroscopic objects $L_2 \ll L_1$ (such ratio also takes place in traditional photography), a minimal image element has dimensions of the order of channel diameter d.

Figure 12:
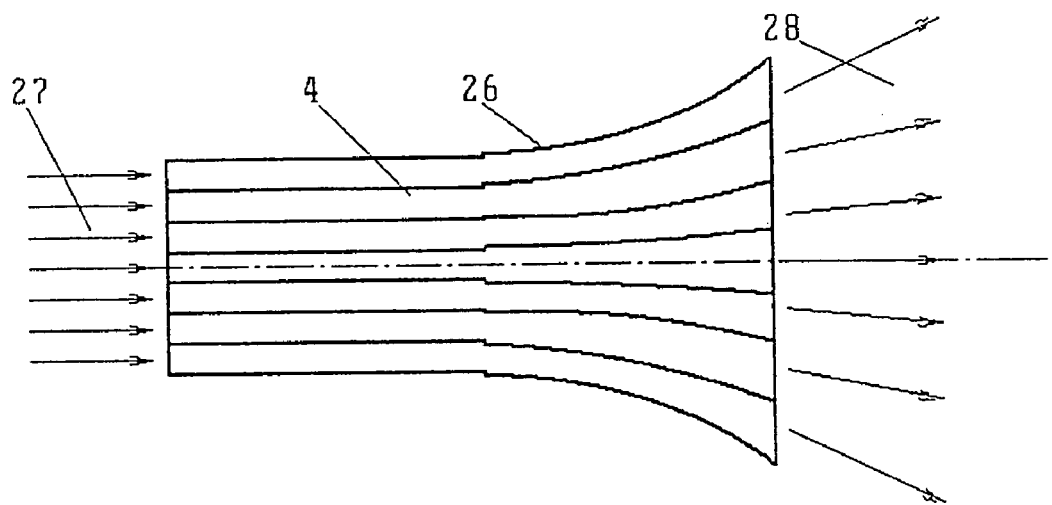

FIG. 12 shows a particular embodiment of a device 26 for transformation of quasi-parallel flux 27 of optical radiation into scattered radiation 28. In this case, output ends of the channels 4 are diverging in different directions away from the longitudinal axis of the device.

Figure 13:
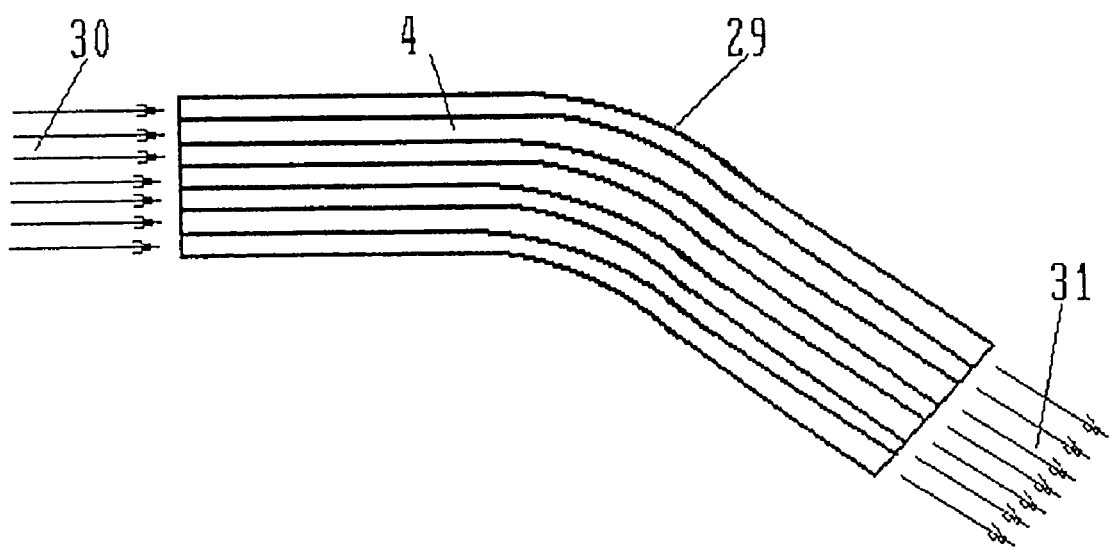

The device 29 shown in FIG. 13 is made in such a way that the longitudinal axes of its channels are equidistant and curved for bending the beam 30 of a quasi-parallel beam of radiation being transformed into a beam 31.

In all the cases of the device embodiments described it is important for its proper operation to exclude transportation of the radiation from input to output of the device through the medium filling up spaces between the channels. As mentioned above, this is achieved by utilization of a coating on one or both end faces of the device (except for the inlet and outlet openings of the channels), which is non-transparent for the optical radiation used, or by making the channels walls and spaces between them of a non-transparent material. Due to this, only radiation transported through the channels takes part in the formation of output flux. From the input side, the channels ensure required selectivity, while their output ends impart to radiation the direction required.

Experiments demonstrate that if no such measures are taken, the radiation is able to penetrate channel walls from one channel to another and propagate through spaces between the channels, in the result of which no effects are achieved, in particular, of focusing and shaping of quasi-parallel flux.

INDUSTRIAL APPLICABILITY

The device proposed may be realized in practice in any of the possible embodiments described, depending on required nature of transformation of the optical radiation flux, technological possibilities and other reasons for these or other preferences.

BIBLIOGRAPHY

1. Physical Encyclopedia, Moscow, "Sovetskaya Entsiklopediya" publishing house, 1984.
2. U.S. Pat. No. 5,192,869 (publ. 09.03.93).
3. Russian Federation patent No.2096353 (publ. 20.11.97).
4. Russian Federation patent No.2164361 (publ. 20.03.2001).
5. U.S. Pat. No. 6,271,534 (publ. 07.08.2001).

The invention claimed is:

1. A device for transformation of an optical radiation beam, said device comprising:
   end faces including an input end face and an output end face, and
   a multitude of channels extending between said end faces for providing passage of optical radiation,
   said channels including reflecting walls and individual longitudinal axes, the channels being evacuated or filled up with air or other gaseous medium,
   said optical radiation passing through said channels with or without reflection from said walls and exiting from said end faces,
   each said channel including an inlet opening and an outlet opening coincident with said end faces,
   continuations of said channels beyond the input and output end faces having shape in aggregate of an input optical radiation beam received by the device and a required output optical radiation beam, and
   at least the input end face of said end faces but not said inlet opening or outlet opening of said channels having a coating of a material non-transparent for the optical radiation in an optical range being used, in order to prevent the optical radiation from being transmitted from the inlet to the output of said device through a medium formed by gaps between said channels.

2. A device of claim 1, characterized in that the part of the device adjacent to its longitudinal axis is made non-transparent for the optical radiation in the optical range being used by making this part solid and containing no channels or by blocking inlet or outlet openings of the central channels after manufacturing of the device containing such channels.

3. A device according to any one of claims 1 and 2, characterized in that said device includes coaxial barrel-shaped surfaces, and said channels are made with longitudinal axes curved along the generating lines of said coaxial barrel-shaped surfaces.

4. A device of claim 3, characterized in that the continuations of longitudinal axes of channels from the side of input and output end faces of the device intersect in points located on continuation of a longitudinal axis of the device.

5. A device of claim 3, characterized in that the continuations of longitudinal axes of the channels from the side of one of end faces of the device intersect in a point located on continuation of said longitudinal axis of the device, while continuations of longitudinal axes of the channels from the side of another end face of the device are parallel to said longitudinal axis of the device.

6. A device of claim 4, characterized in that the channels have a cross section constant with length or cross section with dimensions changing in a manner similar to dimensions of the device as a whole in transverse direction.

7. A device according to any one of claims 1 and 2, characterized in that the continuations of longitudinal axes of the channels from the side of one of end faces of the device intersect in a point located on continuation of the said longitudinal axis of the device or are parallel to it, while continuations of longitudinal axes of the channels from the side of another end side of the channel diverge in different directions from said longitudinal axis of the device.

8. A device according to any one of claims 1 and 2, characterized in that said longitudinal axis of said device has one or several bends and that the channels are equidistant with it.

9. A device for transformation of an optical radiation beam, said device comprising:
   end faces including an input end face and an output end face, and
   a multitude of channels extending between said end faces for providing passage of optical radiation,
   said channels including reflecting walls and individual longitudinal axes, the channels being evacuated or filled up with air or other gaseous medium,
   said optical radiation passing through said channels with or without reflection from said walls and exiting from said end faces,
   each said channel including an inlet opening and an outlet opening coincident with said end faces, continuations of the channels beyond the input and output end faces having shape in aggregate of an input optical radiation beam received by the device and a required output of said optical radiation beam, and
   the walls of said channels and gaps between them, along the entire length of the channels between the end faces of the device, being made of a material non-transparent for the optical radiation in an optical range being used, in order to prevent the optical radiation from being transmitted from the inlet to the output of said device through a medium formed by the gaps between said channels.

10. A device of claim 9, characterized in that the part of the device adjacent to its longitudinal axis is made non-transparent for the optical radiation in the optical range being used by making this part solid of non-transparent material and containing no channels or by blocking inlet or outlet opening of the central channels after manufacturing of the device containing such channels.

11. A device according to any one of claims 9 and 10, characterized in that said device includes coaxial barrel-shaped surfaces, and said channels are made with longitudinal axes curved along the generating lines of said coaxial barrel-shaped surfaces.

12. A device of claim 11, characterized in that the continuations of longitudinal axes of channels from the side of input and output end faces of the device intersect in points located on continuation of said longitudinal axis of the device.

13. A device of claim 11, characterized in that the continuations of longitudinal axes of the channels from the side of one of end faces of the device intersect in a point located on continuation of the longitudinal axis of the device, while continuations of longitudinal axes of the channels from the side of another end face of the device are parallel to said longitudinal axis of the device.

14. A device of claim 13, characterized in that the channels have a cross section constant with length or cross section with dimensions changing in a manner similar to dimensions of the device as a whole in transverse direction.

15. A device according to any one of claims 9 and 10, characterized in that the continuations of longitudinal axes of the channels from the side of one of end faces of the device intersect in a point located on continuation of the longitudinal axis of the device or are parallel to it, while continuations of longitudinal axes of the channels from the side of another end side of the channel diverge in different directions from the longitudinal axis of the device.

16. A device according to any one of claims 9 and 10, characterized in that its longitudinal axis has one or several bends and that the channels are equidistant with it.

17. A device of claim 9, wherein the walls of said channels are made of stained glass.

* * * * *